March 18, 1952  C. H. HOEPPNER  2,589,254
IMPULSE DELAY APPARATUS
Filed March 18, 1946  7 Sheets-Sheet 1
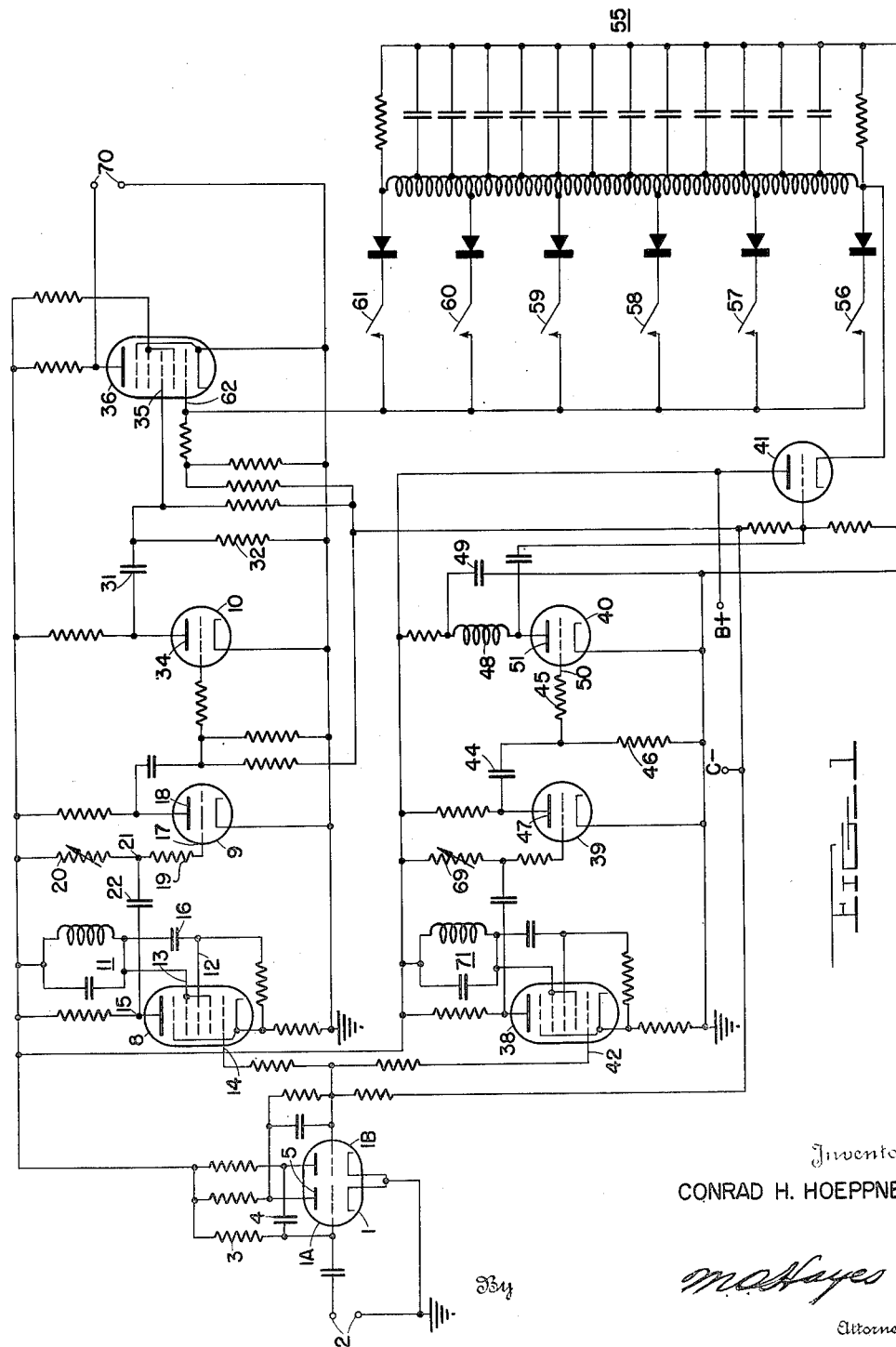
Inventor
CONRAD H. HOEPPNER
By M. O. Hayes
Attorney

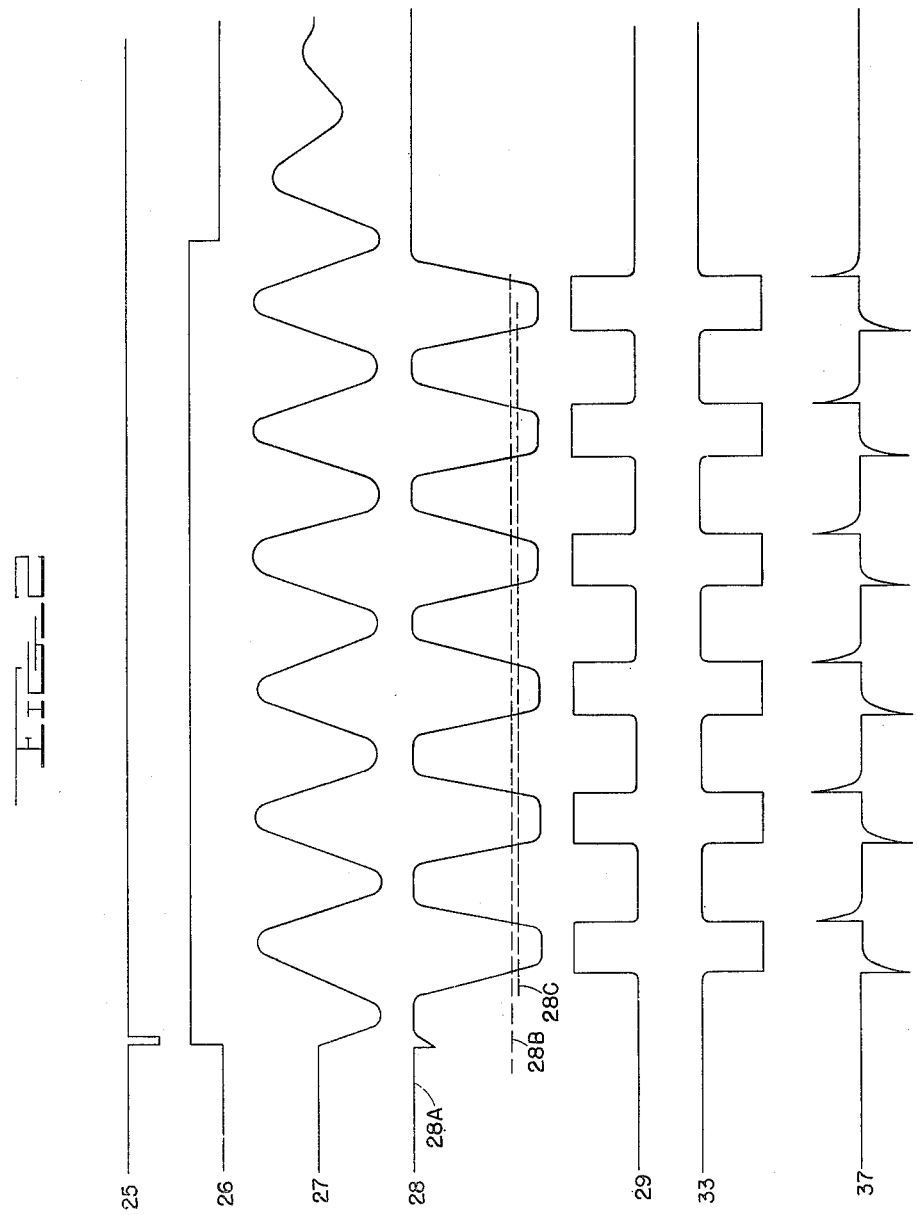

March 18, 1952  C. H. HOEPPNER  2,589,254
IMPULSE DELAY APPARATUS
Filed March 18, 1946  7 Sheets-Sheet 3
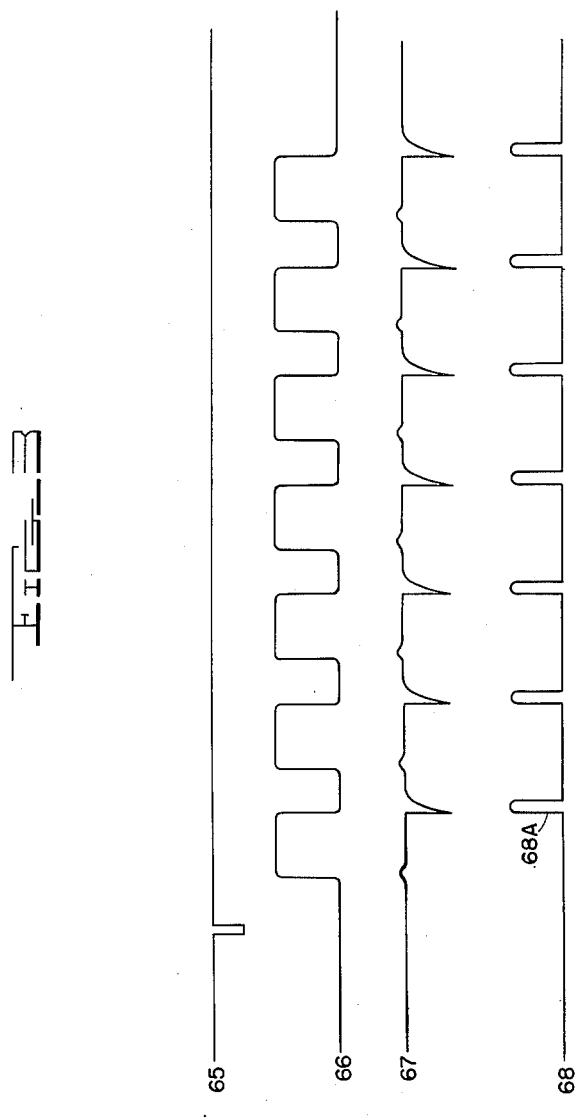
*INVENTOR.*
CONRAD H. HOEPPNER
BY
*attorney*

March 18, 1952
C. H. HOEPPNER
2,589,254
IMPULSE DELAY APPARATUS
Filed March 18, 1946
7 Sheets-Sheet 4
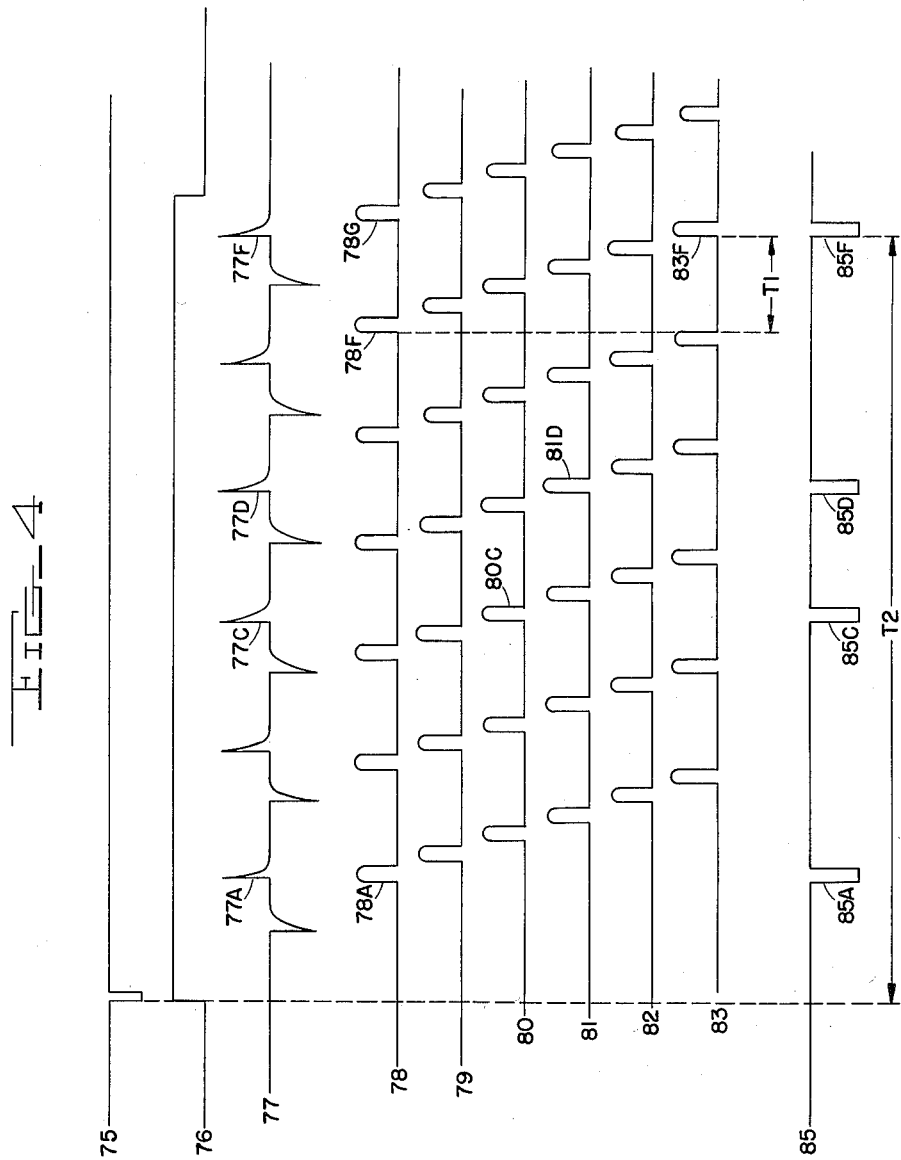
INVENTOR.
CONRAD H. HOEPPNER
BY *M. Hayes*
*attorney*

March 18, 1952 C. H. HOEPPNER 2,589,254
IMPULSE DELAY APPARATUS
Filed March 18, 1946 7 Sheets-Sheet 5
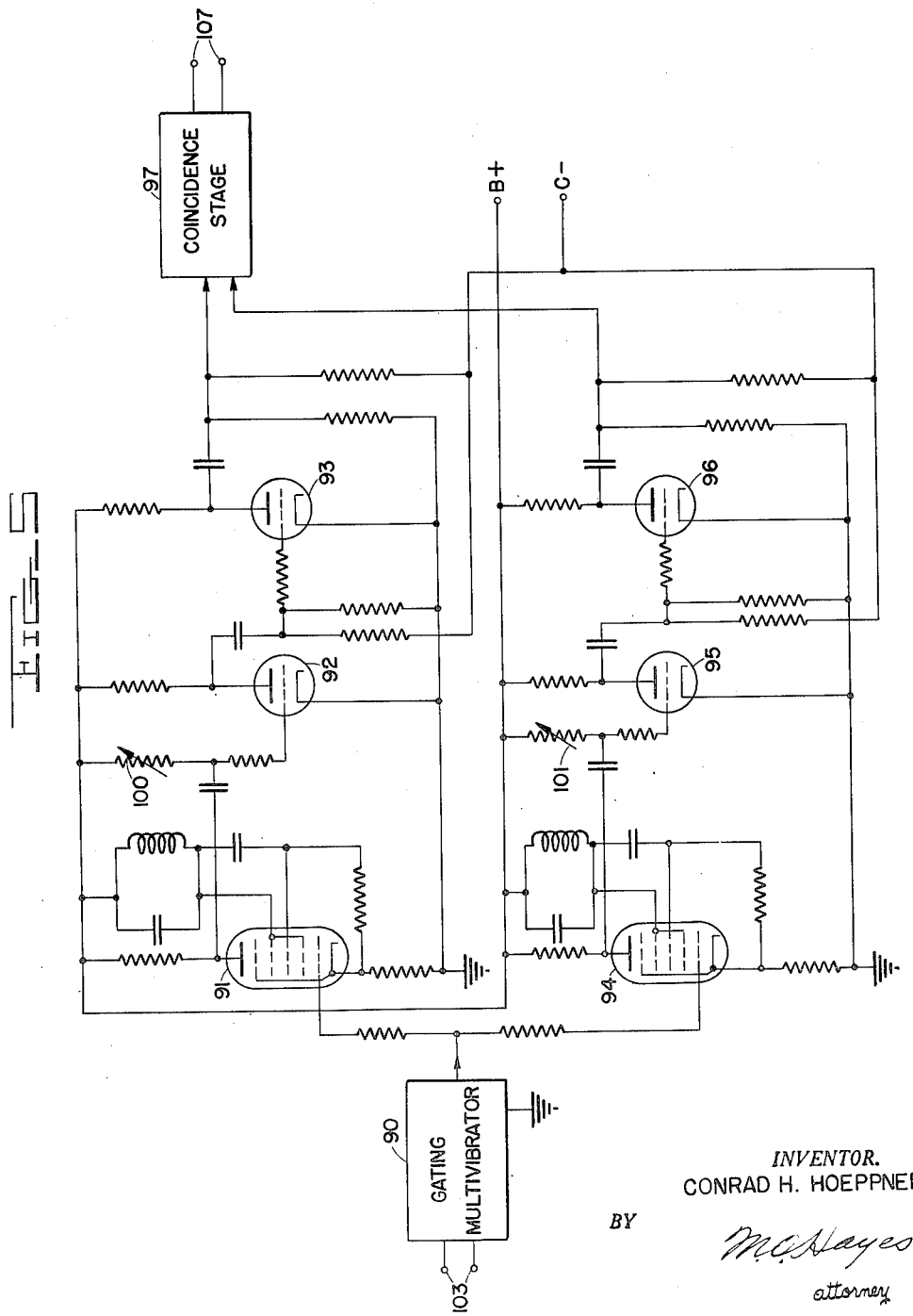
INVENTOR.
CONRAD H. HOEPPNER
BY
M C Hayes
attorney

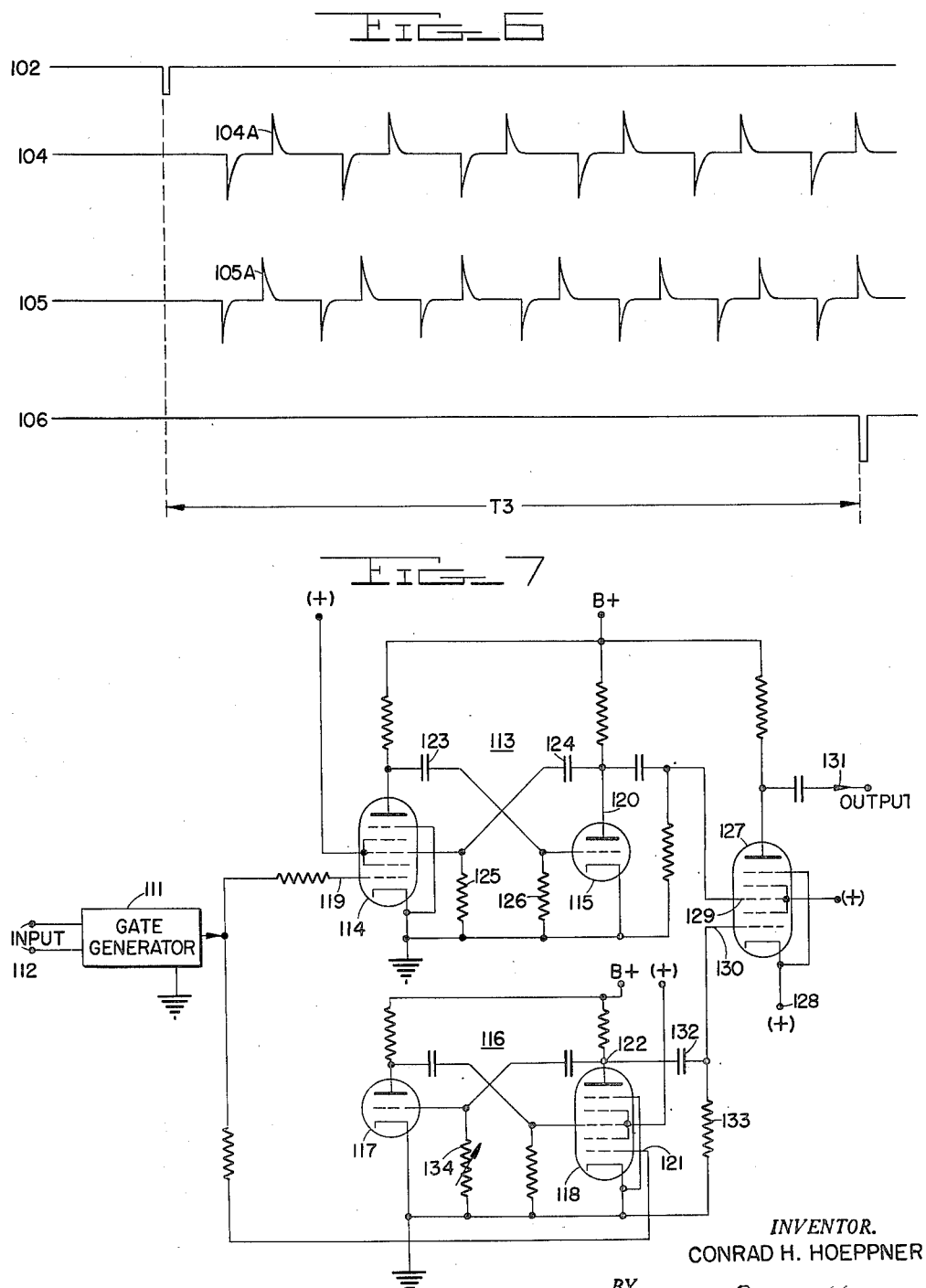

March 18, 1952
C. H. HOEPPNER
2,589,254
IMPULSE DELAY APPARATUS
Filed March 18, 1946
7 Sheets-Sheet 7
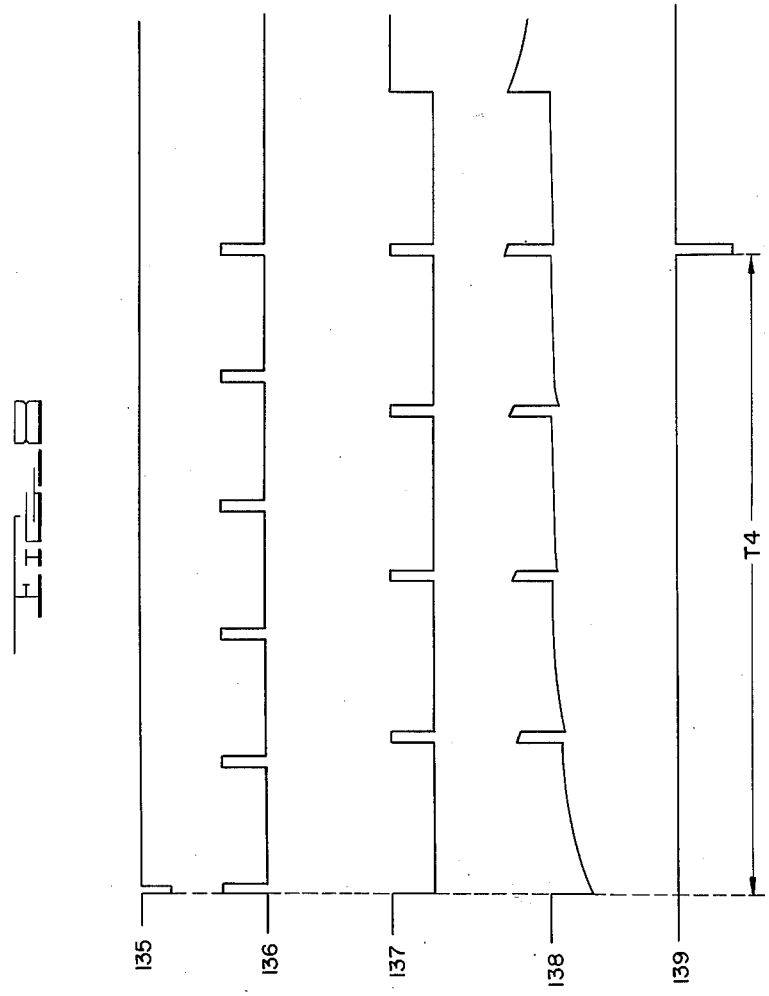
INVENTOR.
CONRAD H. HOEPPNER
BY
attorney Patented Mar. 18, 1952

2,589,254

UNITED STATES PATENT OFFICE 2,589,254

IMPULSE DELAY APPARATUS

Conrad H. Hoeppner, Washington, D. C.

Application March 18, 1946, Serial No. 655,357

16 Claims. (Cl. 250—27)

(Granted under the act of March 3, 1883, as amended April 30, 1928; 370 O. G. 757)

This invention relates broadly to electronic control circuits and in particular to circuits for the production of delayed electrical signals and for the production of pulse groups of selectable structure.

It is possible to construct artificial lines comprising multiple sections of inductance and capacitance which will provide a delay in the transmission of an electrical signal of the order of 100 micro-seconds without sacrificing entirely such desirable features as high accuracy, low attenuation, and low distortion. When, however, an attempt is made to extend the delay of such an artificial line to several times the figure given, merely by increasing the number of sections, a distinct loss in accuracy and dependability of operation results. In its proper delay period range, however, the precision of the artificial line section offers a valuable basis for apparatus which undertakes to provide delays of greater total duration.

In certain pulsed radio frequency communication and control work, the intelligence to be conveyed or the function to be instituted is defined by the arrangement of the members of a series of impulses. This arrangement of signals may be altered simply by number or by time occurrence or by both. Obviously, precise timing is required in those systems which function on the basis of pulse time occurrence. Were precision the sole requirement, it would appear that artificial delay lines or stable oscillators would constitute a ready answer to the problem. The situation is, however, complicated, in all but the more simple cases, by the necessity for selectability, i. e., the ability to include or exclude any member of a series of impulses and the necessity for a series of impulses having relatively long overall time durations.

It is therefore an object of this invention to provide method and apparatus for generating a delayed signal.

It is another object of this invention to provide a method and apparatus for generating a delayed signal which increases the useful range of artificial delay lines or other means of delaying electrical impulses.

It is another object of this invention to provide means and method for securing a delay interval of extended length and high accuracy.

It is another object of this invention to provide apparatus for generating signals delayed a selectable interval of time.

It is another object of this invention to provide method and apparatus for producing a series of signals.

It is another object of this invention to provide method and apparatus for producing groups of signals of selectable group structure.

It is another object of this invention to provide apparatus of low power requirement for producing a group of signals of selectable group structure.

Other objects and features of this invention will become apparent upon a careful consideration of the following detailed description when taken together with the accompanying drawings in which:

Fig. 1 is the circuit diagram of one exemplary embodiment of this invention;

Fig. 2 is a series of waveforms useful in explaining the operation of the circuit of Fig. 1;

Fig. 3 is another series of waveforms useful in explaining the operation of the circuit of Fig. 1;

Fig. 4 is another series of waveforms useful in explaining the operation of the circuit of Fig. 1;

Fig. 5 is the circuit diagram of a variant exemplary embodiment of the invention;

Fig. 6 is a series of waveforms useful in explaining the operation of the circuit of Fig. 5;

Fig. 7 is the circuit diagram of another variant embodiment of this invention; and Fig. 8 is a series of waveforms useful in explaining the operation of the circuit of Fig. 7.

The basic principle underlying this invention is that if two series of recurrent signals of slightly different periodicity be produced simultaneously and an instant of time be chosen such that there is a predetermined relation between two contemporaneous signals, i. e., a predetermined phase relation between the series, each successive member of one of the series will become separated from each corresponding successive member of the other series by an interval of time separation which changes uniformly. In accordance with the particular predetermined relation, the change may be made to represent an increase or it may be made to represent first, a decrease, and then an increase.

For an explanation of means for and method of applying this and other principles in a practical embodiment of this invention, reference is now had to Fig. 1 which is the circuit diagram of apparatus for producing a group of signals of selectable group structure. In this Fig. 1, vacuum tube I together with its associated circuit components represents a means responsive to an input signal at terminals 2 for producing a gating voltage of predetermined time duration. In the form shown it is known as a "self-returning" or "one-shot" multivibrator inasmuch as only left-hand tube section IA conducts in the quiescent condition but right tube section 1B may be caused to conduct and left hand tube section 1A to be cut off for a definite interval of time in response to an input signal at terminals 2. The duration of the interval during which section 1A remains cut off is determined substantially by the RC circuit comprising resistor 3 and capacitor 4. Adjustment of either one of these results in adjustment of the non-conducting period of section 1A. The non-conducting period is characterized by a positive voltage of definite time duration which appears at plate 5 of tube 1. This positive voltage may be used as a "gating" voltage to key the operation of other circuits for a predetermined interval of time.

One such circuit responsive to the gating voltage of multivibrator 1 is that including vacuum tubes 8, 9, and 10. This circuit represents a means for generating a series of electrical signals of definite duration and periodicity. In particular, multigrid vacuum tube 8, together with parallel resonant circuit 11 and the other immediately associated circuit components constitutes a transitron oscillator for the production of a sinusoidal voltage of high purity and great stability. Such a transitron oscillator functions by virtue of the negative transconductance between control grid 12 and screen grid 13 at a frequency determined by the inductance and capacity comprising tank circuit 11. It has the characteristic that it will produce at screen 13 a sinusoidal voltage which always starts in a definite phase and achieves the same amplitude on the first cycle as is maintained in steady operation when tube 8 is unbiased by the application of a positive signal at control grid 14. The starting phase in the circuit shown is such that the first half cycle at screen grid 13 is negative. A similar oscillatory voltage appears at plate 15 of tube 8. This voltage, which is unidirectional with respect to the potential existing at plate 15 in the quiescent condition of the circuit, is not, in this embodiment, sinusoidal as might be expected. The coupling between control grid 12 and screen grid 13 has been made tight enough through choice of capacitor 16 to "overdrive" the plate and distort the expected sinusoid. This distortion results in a waveform which is roughly a cross between a sine wave and a square wave and represents the first step in the generation of a series of impulse signals from the sinusoid. The leading and trailing edges of the distorted waveform are sloping rather than abrupt, a characteristic of which advantage is taken to provide precise timing as is explained in subsequent paragraphs.

Vacuum tube 9 is employed to continue the signal generating process begun at plate 15 of tube 8. Tube 9, a sharp cutoff type for which only a small change in grid 16 potential is required to drive the tube from fully conducting to cutoff or from cutoff to fully conducting, squares up the output of plate 15. This is accomplished by virtue of the fact that only a small segment of a sloping wavefront, representing a short interval of time, applied at grid 17 is amplified by the tube and appears at plate 18 as an abrupt change. Grid 17 is held at substantially cathode potential during quiescence by the direct connection made to B+ potential through resistors 19 and 20 and tube 9 is thus normally in a heavily conducting condition. In accordance with the ratio of resistors 19 and 20, variable by adjustment of resistor 20, a positive potential exists at junction 21. It will be seen that the operation of tube 9 will not be affected by the application of a signal at junction 21 until this positive potential is overcome and grid 17 reduced below cathode potential.

Thus, any particular segment of a sloping negative going wavefront applied to junction 21 through capacitor 22 may be employed to drive tube 9 from conduction to cutoff. For an illustrated explanation of this action, reference is had jointly to the circuit of Fig. 1 and the waveforms of Fig. 2. In Fig. 2, waveform 25 is representative of an input signal at terminals 2 of Fig. 1. Waveform 26 is representative of the gating voltage produced by multivibrator 1 which appears at plate 5 and is employed to key oscillator 8 into operation at grid 14. Waveform 27 is representative of the sinusoidal voltage which appears on screen grid 13 of oscillator 8 when it is keyed by the gating voltage. The distorted waveform at plate 15 of tube 8 is represented by waveform 28. It will be noted that this voltage is unidirectional with respect to quiescent level 28A and that, loosely speaking, it is opposite in phase to the sinusoid at screen 13. The leading and trailing edges are sloping and, superposed on the waveform, are two potential levels 28B and 28C. The difference in potential between these two levels represents the change necessary to drive tube 9 from a fully conducting condition to a cutoff condition and conversely. Neglecting the small potential drop from grid to cathode in tube 9, the difference between potential level 28B and 28A represents the value of the positive potential at which junction 21 is held quiescently with respect to the cathode of tube 9. It will be seen that, by adjusting resistor 20 to change the potential of junction 21, the segments of the leading and trailing edges affecting tube 9 may be chosen and thus the instants in time when tube 9 starts and finishes each square wave may be chosen. This square wave is illustrated in waveform 29 which also illustrates the fact that the leading and trailing edges of the voltage appearing at plate 18 of tube 9 coincide in time with the particular segments of the waveform 28 intercepted by potential levels 28B and 28C.

Vacuum tube 10, together with the differentiating circuit comprising capacitor 31 and resistor 32, continues and completes the recurrent signal generating process. The square wave produced by tube 9, as represented by waveform 29, is amplified and inverted by tube 10 and appears as waveform 33 at plate 34. After differentiation, the output as it appears at grid 35 of multigrid vacuum tube 36 is a series of signals of a frequency determined by oscillator 8 and is represented by waveform 37.

The three tubes 8, 9 and 10 comprise a means responsive to an input signal for generating a series of recurrent signals the initial impulse of which occurs in a predetermined time relation to the input signal.

The four tubes 38, 39, 40 and 41 comprise a second means also responsive to an input signal for generating a series of recurrent signals the initial impulse of which occurs in a predetermined time relation to the input signal.

This second means is controlled at grid 42 of tube 38 by the same gating voltage which controls the first means. Its operation, up to the output circuit of tube 39, is the same as that of the first means up to the output circuit of tube 9. The components of the output circuit of tube 39 comprising capacitor 44, resistor 45, and resistor 46, are so chosen, in combination with the grid to cathode resistance of tube 40 that capacitor 44 assumes a definite charge during each positive square pulse at plate 47 of tube 39. This charge, which is collected by virtue of grid current flow in tube 40, is just sufficient to hold tube 40 cut off for an interval of time at the end of the positive pulse equal to a half cycle at the resonant frequency of the parallel combination of inductance 48 and capacitor 49. Grid 50 of tube 40 is returned to ground potential so that tube 40 is normally conducting heavily through inductance 48. When tube 40 is cut off for the half cycle interval, there appears at plate 51 a positive half cycle of a sine wave. The oscillations which tend to persist in the plate circuit of tube 40 are aborted by the resumption of conduction by tube 40. This positive half cycle is of a nature such that it may be transmitted by a delay line with a minimum of distortion. It is applied to tube 41 which, by cathode follower action, provides a low impedance means for driving delay line 55. Switches 56 through 61 are connected to tapped points on delay line 55 through unilateral impedance elements, or simply capacitatively, to deliver impulses to the grid 62 after delay thereof by selectable intervals of time. If a series of signals is applied to tube 41, each member of the series will be similarly delayed. If two or more switches are closed, and a series of impulses is applied to tube 41, a corresponding two or more series of signals each delayed a respective interval of time will be applied to tube 36 from the tapped points on the delay line.

Joint reference is now had to Fig. 1 and Fig. 3 for further explanation of the foregoing. In Fig. 3, waveform 65 is representative of an input impulse signal at terminals 2 of Fig. 1 (same significance as waveform 25 of Fig. 2). In waveform 66 are shown the square wave pulses which appear at plate 47 of tube 39 in response to this input impulse. Waveform 67 represents the resulting signal at grid 50 of tube 40 and waveform 68 illustrates the series of signals applied by tube 41 to delay line 55. It should be noted here that initial signal 68A of waveform 68 may be shifted in time relation to the input signal of waveform 65 by adjustment of resistor 69 associated with tube 39 just as the initial member of the series produced by the first described means could be shifted in time relation to the input signal by adjustment of resistor 20. From this it will be seen that control is thereby achieved over the time relation between the initial member of each of the series.

Tube 36 represents a means of combining impulses produced by the sequence of tubes 8, 9, and 10 with those produced by tubes 38, 39, 40 and 41. Both grid 35 and grid 62 are so biased in the quiescent condition by connection to C− potential that tube 36 may only conduct when both grids receive positive unbiasing voltages simultaneously. Thus, an output signal appears at terminals 70 when, and only when, signals from both series are combined in time coincidence by tube 36.

In operation, the inductance and capacitance of tank circuit 71 associated with oscillator 38 is so chosen that the frequency of oscillator 38 is slightly greater than that of oscillator 8. Further, resistors 20 and 69 are so adjusted that the initial positive signal of the series applied to grid 35 of tube 36 occurs in time concidence with the initial signal of the series applied by tube 41 to delay line 55. The delay provided at the tapped point on delay line 55 to which switch 57 is connected is chosen to delay the series of impulses at tube 41 the amount required to bring the second member of that series into time coincidence with the second member of the series applied to grid 35 of tube 36. It will be recognized that the difference in periodicity of the two series, as introduced by the frequency difference of the two oscillators, prevents coincidence between these two corresponding members of the two series in the absence of the delay provided. Similarly, the delay provided at the tapped point on delay line 55 to which switch 58 is connected is chosen to delay the series of impulses at tube 41 the interval required to bring the third member of that series into time coincidence with the third member of the series applied to grid 35 of tube 36. Likewise the delays at switches 59, 60, and 61 are such as to bring coincidence between the corresponding fourth, fifth and sixth members of the two series.

Let it be assumed that a group of signals is to be formed and that switches 56, 58, 59, and 61 are selected and closed. An input impulse at terminals 2, as illustrated by waveform 75 of Fig. 4 to which joint reference is now had, produces the gating voltage at multivibrator 1 represented by waveform 76. Waveform 77 is representative of the series of impulses applied to grid 35 of tube 36 in response to the input signal. Waveform 78 shows the series of impulses applied to delay line 55 by tube 41 in response to the input signal. Since switch 56 is closed at the input tapped point on delay line 55 and no delay is introduced, there is time coincidence between initial positive member 77A of waveform 77 and initial member 78A of waveform 78. This time coincidence unbiases tube 36 at both grids 35 and 62 simultaneously and output signal 85A of waveform 85 appears at terminals 70. Waveforms 79, 80, 81, 82, and 83 represent the voltage variations appearing at the tapped points to which switches 57 through 61, respectively, are connected. Since switches 57 and 60 were not among those closed, there is no combination of series 77 and series 79 or of series 77 and series 82. Switches 58, 59, and 61 were closed, however, to combine series 77 with each of series 80, 81, and 83 to produce output signals 85C, 85D, and 85F at terminals 70 in response to the time coincidence of members 77C and 80C, 77D and 81D, and 77F and 83F.

It is obvious that the structure of the output pulse group at terminals 70 is selectable since any one of the six possible signals may be included or excluded by the selection of the proper switches 56 through 61. Also obvious will be the reason for providing the multivibrator 1 with a period such that the series of impulses applied to grid 35 and any of the series at the delay line tap points do not produce a second condition of coincidence. Examination of waveforms 77 and 78 of Fig. 4 reveals that a situation approaching, but not achieving, coincidence exists with respect to impulses 77F and 78G.

While the description of operation just given covers the use of the invention as a means of producing a group of signals of selectable group structure, its use as apparatus for increasing the useful range of artificial delay line 55 is quite similar. It will be seen that, if a delay line 55 is chosen to provide an accurate delay T1 between impulses 78F and 83F and only switch 61 is closed, a total delay of T2, approximately eight times T1, will occur between the application of an input signal at terminals 2 and the appearance of an output signal at terminals 70.

In a variant embodiment, such as that shown in Fig. 5, apparatus constructed and operated in accordance with the teachings of this invention may be employed to delay an electrical impulse without the use of a special delay element such as delay line 55 of Fig. 1. In Fig. 5, a multivibrator 90 shown in block form performs the same gating voltage producing function as multivibrator 1 of Fig. 1. Two means of producing series of signals comprising tubes 91, 92, and 93, and 94, 95, and 96, respectively, are provided, each similar in construction and operation to the means comprising tubes 8, 9, and 10 in Fig. 1. Coincidence means 97 in block form performs the same function as tube 36 of Fig. 1.

In operation, oscillator 91 produces a sinusoidal voltage of a frequency slightly less than that of oscillator 94 so that the two series of impulses applied to coincidence means 97 are of slightly different periodicity. Further, resistors 100 and 101 are adjusted (in the manner hereinbefore described) to provide a predetermined time relation between the respective initial impulses. The several waveforms of Fig. 6 illustrate the operation of this embodiment. Waveform 102 shows an input signal applied at terminals 103 of gating multivibrator 90. Waveform 104 shows the series of impulses produced by tubes 91, 92 and 93. Waveform 105 shows the corresponding series produced by tubes 94, 95 and 96. With the time relation shown between initial positive signal 104A and signal 105A of waveform 105, a delay of T3 is introduced between the application of input signal 102 and the production of output signal 106 at terminals 107. A range of delays is available, not only through adjustment of resistors 100 and 101, but also through choice of the periodicity of the series of impulses.

Fig. 7 shows another variant embodiment also for delaying an electrical impulse. In this Fig. 7, a gate generator 111 similar to the gate generator or multivibrator 1 employed in Fig. 1 is shown in block form. To the input terminals 112 of this generator is supplied a pulse type wave form as shown in 135 of Fig. 8, delayed response to which is desired.

Dual tube circuit 113 comprising tubes 114 and 115 and dual tube circuit 116 comprising tubes 117 and 118 each represent conventional free running type multivibrators gated by means of the signal from generator 111. Circuit 113 is responsive to a gated voltage at grid 119 of tube 114 to produce a series of rectangular positive impulses at plate 120 of tube 115 as shown in waveform 136 of Fig. 8. Similarly, circuit 116 is responsive to a gating voltage at grid 121 of tube 118 to produce a series of rectangular impulses at plate 122 of tube 118 as shown in waveform 137 of Fig. 8. The periodicity and duration of these series of impulses may be fixed by suitable choice of the elements (typified by capacitors 123 and 124 and resistances 125 and 126, coupling tubes 114 and 115) connecting the dual tubes of circuits 113 and 116.

The rectangular impulse type waveforms produced at the plates 120 and 122 are applied through suitable resistance capacitance coupling networks to a biased coincidence tube 127 which is preferably of the multi-grid type. Tube 127 is maintained in a normally non-conductive condition by a positive potential 128 applied to its cathode, grids 129 and 130 being normally at the ground or reference potential. Coincidence in time of an input impulse of each series after a total delay time T4 results in the production of the output signal at terminal 131 as shown in waveform 139 of Fig. 8. The rectangular impulse type waveform applied to grid 130 is preferably differentiated slightly by the coupling circuit including capacitance 132 and resistance 133 so that a delay circuit similar to the line 55 of Fig. 1 is not required. The differentiated waveform shown in 138 of Fig. 8 represents the actual voltage applied to grid 130 of tube 127. It is noted that the large amplitude initial negative excursion of the plate 122 of waveform 138 prevents conduction of the coincidence tube 127 in the initial circuit operation so that the delay circuit is not required. The delay time may be adjusted quite closely by variation of the resistance 134 in the grid circuit of tube 117 which varies the duration of the interval between the impulses produced at the plate 122 of tube 118 and shown in waveform 137 of Fig. 8. For a high degree of accuracy, it may be desirable to stabilize the operation of the multivibrator 113 for accuracy.

Since certain further changes may be made in the foregoing constructions and different embodiments of the invention may be made without departing from the scope thereof, it is intended that all matter shown in the accompanying drawings or set forth in the accompanying specification shall be interpreted as illustrative and not in a limiting sense.

The invention described herein may be manufactured and used by or for the Government of the United States of America for governmental purposes without the payment of any royalties thereon or therefor.

What is claimed is:

1. The method of generating a delayed signal comprising, receiving an input signal, producing in response to said input signal two non-harmonically related recurrent signals of different frequency which initially have a first predetermined phase relation, combining said two recurrent signals, and producing responsively to said two recurrent signals an output signal only when they assume a second predetermined phase relation.

2. The method of generating a delayed signal comprising, receiving an input signal, producing in response to said input signal two series of non-harmonically related recurrent signals of different periodicity the initial signals of which occur with a first predetermined time relation, combining said two series of signals, and producing responsively to said two series of signals an output signal only when the subsequent signals of said two series occur with a second predetermined time relation.

3. The method of generating a delayed signal comprising, receiving an input signal, producing in response to said input signal two series of non-harmonically related recurrent signals of different periodicity the initial signals of which occur with a predetermined time relation, combining said two series of signals, and producing an output signal from said combination only when impulses of said series occur in time coincidence.

4. The method of producing a group of signals of selectable group structure comprising, receiving an input signal, producing in response to said input signal a first recurrent signal of one frequency, also producing in response to said input signal a plurality of recurrent signals each of a second frequency non-harmonically related to the frequency of the first signal and each having a respective starting phase relation with said first recurrent signal, combining said first recurrent signal with said plurality of recurrent signals, and producing an output signal from said combination only when any one of said plurality of recurrent signals combined with said first recurrent signal assumes a predetermined phase relation with respect thereto.

5. The method of producing a group of signals of selectable group structure comprising, receiving an input signal, producing in response to said input signal a first series of recurrent signals of one periodicity, also producing in response to said input signal a plurality of series of recurrent signals each of a second periodicity and frequency non-harmonically related to the frequency of the first series of recurrent signals, the initial member of each of which occurs in a respective starting time relation with the initial member of said first series, combining said first series with said plurality of series, and producing an output signal only when any subsequent member of any of said plurality of series combined with said first series occurs in a predetermined time relation with any subsequent member of said first series.

6. The method of producing a group of signals of selectable group structure comprising, receiving an input signal, producing in response to said input signal a first series of recurrent signals of one periodicity, also producing in response to said input signal a plurality of series of recurrent signals each of a second periodicity and frequency non-harmonically related to the frequency of the first series of recurrent signals, the initial member of each of which occurs in a respective starting time relation with the initial member of said first series, combining said first series with said pluralty of series, and producing an output signal only when any subsequent member of any of said plurality of series combined with said first series occurs in time coincidence with any subsequent member of said first series.

7. The method of generating a delayed signal comprising, receiving an input signal, producing in response to said input signal a first sinusoidal voltage of one frequency, also producing in response to said input pulse a second sinusoidal voltage of another non-harmonically related frequency which starts in a predetermined phase relation with said first sinusoidal voltage, generating from said first voltage a first series of recurrent signals with a fixed phase relation to said first voltage, generating from said second voltage a second series of recurrent signals with a fixed phase relation to said second voltage, combining said first and second series of signals, and producing responsively to the combination of said two recurrent signals an output signal only when said two recurrent signals assume a predetermined phase relation one to the other.

8. Apparatus for generating a delayed signal comprising, signal generating means responsive to an input signal for producing a plurality of non-harmonically related recurrent signals at least two of which have slightly different frequencies and initially have a first predetermined phase relation, and means including a vacuum tube coincidence circuit combining said recurrent signals for producing an output signal only when at least two of said recurrent signals assume a second predetermined phase relation.

9. Apparatus for producing a group of signals of selecable group structure comprising, signal generating means operative at one frequency and responsive to an input signal to produce a first recurrent signal of one frequency, means including a second signal generating means operative at a frequency non-harmonically related to the frequency of the first signal generating means also responsive to said input signal to produce a selectable plurality of recurrent signals each of a second frequency slightly different from said one frequency and each having a respective starting phase relation with said first recurrent signal, means combining said first recurrent signal with said plurality of recurrent signals, and means responsive to said combination of signals producing an output signal when each of said plurality of signals combined as said assumes a predetermined phase relation with respect to said first series.

10. Apparatus for producing a group of signals of selectable group structure comprising, signal generating means operative at one frequency and responsive to an input signal to produce a first series of recurrent signals of one periodicity, means including a second signal generating means operative at a frequency non-harmonically related to the frequency of the first signal generating means also responsive to said input signal to produce a selectable plurality of series of recurrent signals each of a second periodicity slightly different from said one periodicity the initial member of each of which occurs in a respective starting time relation with the initial member of said first series, means combining said first series with said plurality of series, and means responsive to said combination of series producing an output signal when any subsequent member of any of said plurality of series combined with said first series occurs in a predetermined time relation with any subsequent member of said first series.

11. Apparatus for generating a delayed signal comprising, signal generating means operative at one frequency and responsive to an input signal to produce a first sinusoidal voltage of one frequency, means including a second signal generating means operative at a frequency non-harmonically related to the frequency of the first signal generating means also responsive to said input signal to produce a second sinusoidal voltage of another frequency which starts in a predetermined phase relation with said first sinusoidal voltage, means generating from said first voltage a first series of recurrent signals with a fixed phase relation to said first voltage, means generating from said second voltage a second series of recurrent signals with a fixed phase relation to said second voltage, means combining said first and second series of signals, and means producing responsively to the combination of said two recurrent signals an output signal when said two recurrent signals assume a predetermined phase relation one to the other.

12. Apparatus for generating a delayed signal comprising, a pair of signal generators tuned to non-harmonically related frequencies responsive to an input signal to produce two sinusoidal voltages of different frequency which start with a predetermined phase relation, means producing from each of said sinusoidal voltages a series of recurrent signals, means delaying one of said series a selectable interval of time, means combining the other of said series and said delayed series, and means producing responsively to the series as combined an output signal when said combined series assume a predetermined phase relation one to the other.

13. Apparatus for generating a delayed signal comprising, a signal generator tuned to one frequency and responsive to an input signal to produce a first sinusoidal voltage of one frequency, a second signal generator tuned to a frequency non-harmonically related to the frequency of the first signal generator also responsive to said input signal to produce a second sinusoidal voltage of another frequency which starts in phase with said first sinusoidal voltage, means generating from said first voltage a first series of recurrent signals with a fixed phase relation to said first voltage, means generating from said second voltage a second series of recurrent signals with a fixed phase relation to said second voltage, means for delaying said second series of signals a selectable interval of time, means for combining said first series and said second series delayed as said, and means producing responsively to said two series as combined an output signals when said delayed series assumes a predetermined phase relation with said first series.

14. Apparatus for producing a group of signals of selectable group structure comprising, a signal generator tuned to one frequency and operatively responsive to an input signal to produce a first sinusoidal voltage of one frequency, a second signal generator tuned to a frequency non-harmonically related to the frequency of the first signal generator also operatively responsive to said input signal to produce a second sinusoidal voltage of another frequency slightly different from said one frequency whicl. starts in phase with said first sinusoidal voltage, means producing from said first voltage a first series of recurrent signals with a fixed phase relation to said first voltage, means generating from said second voltage a second series of recurrent signals with a fixed phase relation to said second voltage, means for delaying said second series of signals a plurality of different intervals of time to produce therefrom a plurality of delayed series of signals, means combining said first series and said plurality of delayed series, and means producing responsively to said combination of series an output signal when each of said plurality of series combined with said first series assumes a predetermined phase relation with respect to said first series.

15. Apparatus for producing a group of signals of selectable group structure comprising, oscillator means responsive to an input signal for producing a predetermined number of cycles of a first sinusoidal voltage of one frequency, oscillator means also responsive to said input signal for producing a predetermined number of cycles of a second sinusoidal voltage of another frequency which starts in phase with said first sinusoidal voltage, vacuum tube means connected to first said oscillator for producing from said first voltage a first series of recurrent signals with a fixed phase relation to said first voltage, vacuum tube means connected to second said oscillator for producing from said second voltage a second series of recurrent signals with a fixed phase relation to said second voltage, means connected to last said vacuum tube means delaying said second series a plurality of different intervals of time to produce therefrom a plurality of delayed series of signals, a plurality of switching means each connected to said delaying means and each corresponding to a respective one of said plurality of delayed series, and vacuum tube means connected to first said vacuum tube means and to each of said switching means operative to produce an output signal when each of said plurality of series applied thereto by said switching means assumes a predetermined phase relation with respect to said first series.

16. Apparatus for producing a group of signals of selectable group structure comprising, vacuum tube gating means responsive to an input pulse for producing a gating voltage, a first transitron oscillator connected to said gating means and keyed by said gating voltage for its duration to produce a first sinusoidal voltage of one frequency, a second transitron oscillator also connected to said gating voltage to produce for its duration a second sinusoidal voltage of another frequency which startes in phase with said first sinusoidal voltage, vacuum tube generating means connected to said first oscillator for generating from said first voltage a first series of recurrent signals with a fixed phase relation to said first voltage, vacuum tube generating means connected to said second oscillator for generating from said second voltage a second series of recurrent signals with a fixed phase relation to said second voltage, a delay line tapped at a plurality of delay defining points connected to receive and delay the output of last said vacuum tube generating means, a plurality of switching means each connected to a respective tapped point on said delay line, and vacuum tube coincidence means connected to first said vacuum tube generating means and to each of said switching means for producing an output signal in response to each simultaneous application of signals thereto by said first vacuum tube means and said switching means.

CONRAD H. HOEPPNER.

REFERENCES CITED

The following references are of record in the file of this patent:

UNITED STATES PATENTS

| Number | Name | Date |
| --- | --- | --- |
| 2,145,332 | Bedford | Jan. 31, 1939 |
| 2,425,600 | Kendall | Aug. 12, 1947 |

FOREIGN PATENTS

| Number | Country | Date |
| --- | --- | --- |
| 510,881 | Great Britain | Aug. 8, 1939 |